(12) United States Patent
Bailey

(10) Patent No.: US 9,507,562 B2
(45) Date of Patent: Nov. 29, 2016

(54) USING VOICE RECOGNITION FOR RECORDING EVENTS

(71) Applicant: Navico Holding AS, Egersund (NO)

(72) Inventor: Paul Robert Bailey, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 14/333,001

(22) Filed: Jul. 16, 2014

(65) Prior Publication Data

US 2015/0058020 A1 Feb. 26, 2015

Related U.S. Application Data

(60) Provisional application No. 61/980,550, filed on Apr. 16, 2014, provisional application No. 61/868,444, filed on Aug. 21, 2013.

(51) Int. Cl.
*G10L 21/00* (2013.01)
*G06F 3/16* (2006.01)
*G06F 1/16* (2006.01)
*A01K 97/00* (2006.01)

(52) U.S. Cl.
CPC ............... *G06F 3/167* (2013.01); *A01K 97/00* (2013.01); *G06F 1/163* (2013.01); *G06F 1/1694* (2013.01); *G06F 2200/1637* (2013.01)

(58) Field of Classification Search
None
See application file for complete search history.

(56) References Cited

U.S. PATENT DOCUMENTS

| | | |
|---|---|---|
| 4,829,493 A | 5/1989 | Bailey |
| 4,879,697 A | 11/1989 | Lowrance et al. |
| 5,025,423 A | 6/1991 | Earp |
| 5,191,341 A | 3/1993 | Gouard et al. |
| 5,321,391 A | 6/1994 | Fox |
| 5,446,775 A | 8/1995 | Wright et al. |
| 5,537,380 A | 7/1996 | Sprankle, Jr. et al. |
| 5,546,695 A | 8/1996 | Langer |
| 6,222,449 B1 * | 4/2001 | Twining ................. A01K 97/00 177/148 |

(Continued)

FOREIGN PATENT DOCUMENTS

| | | |
|---|---|---|
| DE | 102004059619 A1 | 6/2006 |
| EP | 1 561 377 A1 | 8/2005 |

(Continued)

OTHER PUBLICATIONS

Allen, et al.; Upper Extremity Kinematic Trends of Fly-Casting; Establishing the Effects of Line Length; Sports Biomechanics; vol. 7, No. 1; Jan. 1, 2008; pp. 38-53.

(Continued)

*Primary Examiner* — Satwant Singh
(74) *Attorney, Agent, or Firm* — Nelson Mullins Riley & Scarborough LLP

(57) ABSTRACT

Various implementations described herein are directed to a wearable device used to determine whether audio data corresponds to a fishing event. The wearable device may include at least one microphone. The wearable device may include a computer system with a processor and memory. The memory may have a plurality of executable instructions. When the executable instructions are executed by the processor, the processor may receive audio data from the at least one microphone, determine whether the received audio data corresponds to a fishing event and store a record of the fishing event, and a timestamp corresponding to the fishing event.

18 Claims, 9 Drawing Sheets

(56) References Cited

U.S. PATENT DOCUMENTS

| | | |
|---|---|---|
| 6,225,984 B1 | 5/2001 | Crawford |
| 6,252,544 B1 | 6/2001 | Hoffberg |
| 6,263,147 B1 | 7/2001 | Tognazzini |
| 6,321,158 B1 | 11/2001 | DeLorme et al. |
| 6,411,283 B1 | 6/2002 | Murphy |
| 6,418,080 B2 | 7/2002 | Inouchi |
| 6,421,299 B1 | 7/2002 | Betts et al. |
| 6,459,372 B1 | 10/2002 | Branham et al. |
| 6,567,792 B1 * | 5/2003 | Arnold .................. A01K 79/00 43/54.1 |
| 6,584,722 B1 * | 7/2003 | Walls ..................... A01K 97/00 377/5 |
| 6,587,740 B2 * | 7/2003 | Byrne .................... G06Q 30/02 43/4.5 |
| 6,751,626 B2 | 6/2004 | Brown et al. |
| 6,761,692 B2 | 7/2004 | Angelsen et al. |
| 6,798,378 B1 | 9/2004 | Walters |
| 6,816,782 B1 | 11/2004 | Walters et al. |
| 7,002,579 B2 | 2/2006 | Olson |
| 7,236,426 B2 | 6/2007 | Turner et al. |
| 7,243,457 B1 | 7/2007 | Smith et al. |
| 7,319,992 B2 | 1/2008 | Gaos |
| 7,321,824 B1 | 1/2008 | Nesbitt |
| 7,430,461 B1 | 9/2008 | Michaels |
| 7,652,952 B2 | 1/2010 | Betts et al. |
| 7,669,360 B2 * | 3/2010 | Davidson ............... A01K 85/01 43/17 |
| 7,710,825 B2 | 5/2010 | Betts et al. |
| 7,722,218 B2 | 5/2010 | Leung |
| 7,729,203 B2 | 6/2010 | Betts et al. |
| 7,755,974 B2 | 7/2010 | Betts et al. |
| 7,812,667 B2 | 10/2010 | Fagg |
| 7,870,496 B1 | 1/2011 | Sherwani |
| 7,890,867 B1 | 2/2011 | Margulis |
| 8,019,532 B2 | 9/2011 | Sheha et al. |
| 8,040,758 B1 | 10/2011 | Dickinson |
| 8,063,540 B2 | 11/2011 | Angelsen et al. |
| 2001/0054961 A1 | 12/2001 | Twining |
| 2002/0035574 A1 | 3/2002 | Dumas |
| 2002/0093541 A1 | 7/2002 | Schileru-Key |
| 2002/0099457 A1 | 7/2002 | Fredlund et al. |
| 2003/0046689 A1 | 3/2003 | Gaos |
| 2003/0056419 A1 | 3/2003 | Squires et al. |
| 2003/0089020 A1 | 5/2003 | Dirito |
| 2004/0124297 A1 | 7/2004 | Steer |
| 2004/0162830 A1 | 8/2004 | Shirwadkar et al. |
| 2004/0193364 A1 | 9/2004 | Chojnacki |
| 2004/0249860 A1 * | 12/2004 | Stechschulte ......... A01K 97/00 |
| 2005/0037872 A1 | 2/2005 | Fredlund et al. |
| 2005/0102101 A1 | 5/2005 | Beesley et al. |
| 2006/0013066 A1 | 1/2006 | Nishimori et al. |
| 2006/0048434 A1 | 3/2006 | Congel |
| 2006/0119585 A1 | 6/2006 | Skinner |
| 2006/0224940 A1 | 10/2006 | Lee |
| 2006/0265931 A1 * | 11/2006 | McFadden ........... A01K 97/125 43/17 |
| 2007/0011334 A1 | 1/2007 | Higgins et al. |
| 2007/0045010 A1 | 3/2007 | Kasperek |
| 2007/0058489 A1 | 3/2007 | Bratcher |
| 2007/0220798 A1 | 9/2007 | Davidson |
| 2008/0126935 A1 | 5/2008 | Blomgren |
| 2008/0165022 A1 | 7/2008 | Herz et al. |
| 2008/0204424 A1 | 8/2008 | Jin et al. |
| 2008/0246627 A1 | 10/2008 | Guazzelli |
| 2009/0064055 A1 | 3/2009 | Chaudhri et al. |
| 2009/0099871 A1 | 4/2009 | Gadodia |
| 2009/0105952 A1 | 4/2009 | Grace et al. |
| 2009/0179789 A1 | 7/2009 | Haughay, Jr. et al. |
| 2009/0240354 A1 | 9/2009 | Davidson |
| 2009/0241636 A1 | 10/2009 | Obori |
| 2009/0249247 A1 | 10/2009 | Tseng et al. |
| 2009/0258710 A1 | 10/2009 | Quatrochi |
| 2009/0271054 A1 | 10/2009 | Dokken |
| 2009/0287409 A1 | 11/2009 | Summers |
| 2009/0295626 A1 | 12/2009 | Su |
| 2010/0049468 A1 | 2/2010 | Papadourakis |
| 2010/0080082 A1 | 4/2010 | Betts et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2011/0007035 A1 | 1/2011 | Shai |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0082644 A1 | 4/2011 | Imasaka et al. |
| 2011/0154183 A1 | 6/2011 | Burns et al. |
| 2011/0208479 A1 | 8/2011 | Chaves |
| 2011/0213515 A1 | 9/2011 | Haymart et al. |
| 2011/0214500 A1 | 9/2011 | Cabrera et al. |
| 2011/0257819 A1 | 10/2011 | Chen et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0047790 A1 | 3/2012 | Hess et al. |
| 2012/0069712 A1 | 3/2012 | Potanin et al. |
| 2012/0106300 A1 | 5/2012 | Maguire |
| 2012/0144384 A1 | 6/2012 | Baek |
| 2012/0144723 A1 | 6/2012 | Davidson |
| 2012/0185801 A1 | 7/2012 | Madonna et al. |
| 2012/0316456 A1 | 12/2012 | Rahman et al. |
| 2012/0317167 A1 | 12/2012 | Rahman et al. |
| 2013/0007665 A1 | 1/2013 | Chaudhri et al. |
| 2013/0040714 A1 | 2/2013 | Rosing |
| 2013/0074051 A1 | 3/2013 | Freeman |
| 2013/0096575 A1 | 4/2013 | Olson |
| 2013/0107031 A1 | 5/2013 | Atkinson |
| 2013/0281087 A1 | 10/2013 | Ruhanen et al. |
| 2013/0307720 A1 | 11/2013 | Lilburn |
| 2013/0343151 A1 | 12/2013 | Shiraki et al. |
| 2014/0012587 A1 * | 1/2014 | Park ...................... H04W 12/06 704/275 |
| 2014/0032468 A1 | 1/2014 | Anandaraj |
| 2014/0071059 A1 | 3/2014 | Girault |
| 2014/0111368 A1 | 4/2014 | Lee et al. |
| 2014/0180566 A1 | 6/2014 | Malhotra |
| 2014/0195297 A1 | 7/2014 | Abuelsaad et al. |
| 2014/0358483 A1 | 12/2014 | da Rosa |
| 2015/0019135 A1 | 1/2015 | Kacyvenski |
| 2015/0051786 A1 | 2/2015 | Wang |
| 2015/0054655 A1 | 2/2015 | Bailey |
| 2015/0054732 A1 | 2/2015 | Bailey |
| 2015/0054828 A1 | 2/2015 | Bailey |
| 2015/0054829 A1 | 2/2015 | Bailey |
| 2015/0055827 A1 * | 2/2015 | Bailey .................... G08C 17/02 382/103 |
| 2015/0055930 A1 | 2/2015 | Bailey |
| 2015/0057929 A1 * | 2/2015 | Bailey .................... G08C 17/02 701/526 |
| 2015/0057965 A1 | 2/2015 | Gaynor |
| 2015/0057968 A1 | 2/2015 | Bailey |
| 2015/0058020 A1 | 2/2015 | Bailey |
| 2015/0058237 A1 | 2/2015 | Bailey |
| 2015/0058323 A1 | 2/2015 | Bailey |
| 2015/0310524 A1 | 10/2015 | Gospodarek et al. |
| 2016/0125348 A1 * | 5/2016 | Dyer .................. G06Q 10/06398 705/7.42 |

FOREIGN PATENT DOCUMENTS

| | | |
|---|---|---|
| EP | 2 613 223 A1 | 7/2013 |
| JP | 2004 207812 A | 7/2004 |
| JP | 2006-158239 A | 6/2006 |
| JP | 2010 193284 A | 9/2010 |
| JP | 2011 139647 A | 7/2011 |
| WO | 98/02037 A1 | 1/1998 |
| WO | 2004/088572 | 10/2004 |
| WO | 2010/056392 | 5/2010 |
| WO | 2012/170163 | 12/2012 |
| WO | 2014/088508 A1 | 6/2014 |
| ZA | 200 308 052 A | 7/2004 |

(56) References Cited

FOREIGN PATENT DOCUMENTS

OTHER PUBLICATIONS

First look at new Mio Link ANT +/Bluetooth Smart Optical heart rate wrist band; http://www.dcrainmaker.com/2014/01/mio-link-first-look.html; Jan. 6, 2014 (accessed Apr. 19, 2016).
SAS, "SAS BI Dashboard 4.31 User's Guide", Second Edition, by SAS Electronic book, Aug. 1, 2012, downloaded at http://support.sas.com/documentation/cdl/en/bidbrdug/ 65580/PDF/default/bldrdrug.pdf.
PCT International Search Report and Written Opinion; PCT/IB2013/060285, dated Feb. 18, 2014.
PCT International Search Report and Written Opinion; PCT/IB2014/063974, dated Dec. 2, 2014.
PCT International Search Report and Written Opinion; PCT/IB2014/063975, dated Dec. 3, 2014.
PCT International Search Report and Written Opinion; PCT/IB2014/063976, dated Dec. 12, 2014.
PCT International Search Report and Written Opinion; PCT/IB2014/063979, dated Jan. 7, 2015.
PCT International Search Report and Written Opinion; PCT/IB2014/063980, dated Jan. 5, 2015.
PCT International Search Report and Written Opinion; PCT/IB2014/063982, dated Dec. 22, 2014.
PCT International Search Report and Written Opinion; PCT/IB2014/063983, dated Mar. 5, 2015.
PCT International Search Report and Written Opinion; PCT/US2013/047645, dated Sep. 27, 2013.
PCT International Search Report and Written Opinion; PCT/US2013/047869, dated Oct. 21, 2013.
PCT International Search Report and Written Opinion; PCT/US2013/047926, dated Oct. 11, 2013.
PCT International Search Report and Written Opinion; PCT/US2013/048129, dated Oct. 17, 2013.
PCT International Search Report and Written Opinion; PCT/US2013/048177, dated Oct. 21, 2013.
PCT International Search Report and Written Opinion; PCT/IB2014/063973, dated Nov. 28, 2014.
PCT International Search Report and Written Opinion; PCT/IB2014/063981, dated Feb. 10, 2015.
PCT International Search Report and Written Opinion; PCT/IB2014/063978, dated Dec. 19, 2014.
PCT International Search Report and Written Opinion; PCT/IB2014/063977, dated Nov. 28, 2014.

\* cited by examiner

USING VOICE RECOGNITION FOR RECORDING EVENTS

CROSS-REFERENCE TO RELATED APPLICATIONS

This application claims the benefit of U.S. Provisional Patent Application Ser. No. 61/868,444, filed Aug. 21, 2013 titled FISHING DATA COLLECTION AND USE and U.S. Provisional Patent Application Ser. No. 61/980,550, filed Apr. 16, 2014 titled USING VOICE RECOGNITION FOR RECORDING EVENTS, the disclosures of which are incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Accurate data, such as, a count of fishing casts made, can be very useful for a fisherman. A device that can capture this data can provide advantages to a fisherman. Such advantages include requiring less time to record information, and collecting more accurate data.

SUMMARY

Described herein are implementations of various technologies for an apparatus for receiving audio data and determining whether the received audio data corresponds to a fishing event. In one implementation, the apparatus is a wearable device. The wearable device includes at last one microphone. The wearable device includes a computer system with a processor and memory. The memory has a plurality of executable instructions. When the executable instructions are executed by the processor, the processor may receive audio data from the at least one microphone, determine whether the received audio data corresponds to a fishing event and store a record of the fishing event and a timestamp corresponding to the fishing event.

Described herein are also implementations of various technologies for a method for determining that audio data corresponds to a fishing event. In one implementation, a non-transitory computer-readable medium having stored thereon computer-executable instructions which, when executed by a computer, cause the computer to perform various actions. The actions may include receiving audio data from one or more microphones. The actions may include determining that the audio data corresponds to a fishing event. The actions may also include storing a record of the fishing event and a timestamp corresponding to the fishing event.

Described herein are also implementations of various technologies for a method for determining that audio data corresponds to a fishing event. In one implementation, a non-transitory computer-readable medium having stored thereon computer-executable instructions which, when executed by a computer, cause the computer to perform various actions. The actions may include receiving audio data from one or more microphones. The actions may include determining that the audio data corresponds to a voice command for operating a marine electronics device. The actions may also include performing an action corresponding to the voice command on the marine electronics device.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1A:
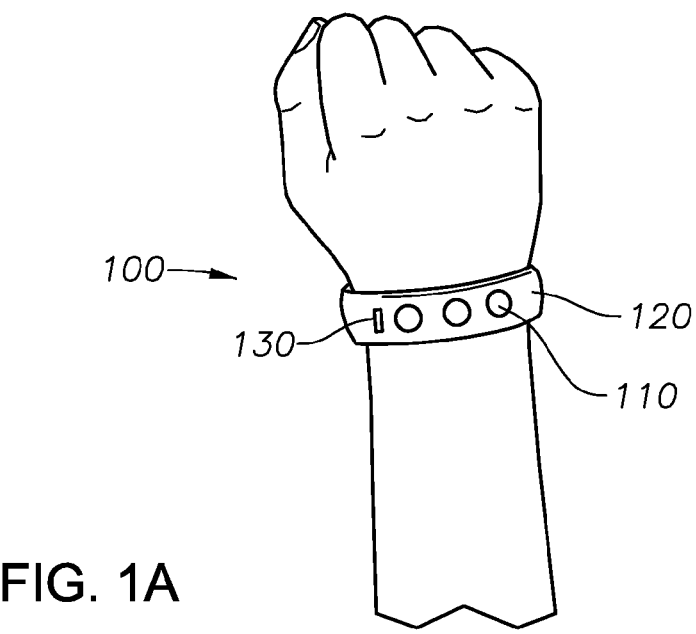
FIG. 1A illustrates a wearable device in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations of using voice recognition for recording events described herein will now be described in more detail with reference to FIGS. 1-8.

Wearable Device

Fishermen often record details of their fishing trips so that the information can be referenced at a later time, and so that the trip can be analyzed. By using a wearable device that captures motion and audio and determines when a cast has been made, or any other fishing event has occurred, fishing data can easily be recorded by a computer system without the need for significant user input, i.e., the input may be "hands free" and automatic. Accordingly, FIG. 1 illustrates a wearable device 100 in accordance with various implementations described herein. The wearable device 100 may be worn around the fisherman's arm or wrist. The wearable device 100 could also be attached to a fishing rod.

The wearable device 100 may include a housing 120. In one implementation, the housing 120 may be in the shape of a band. The housing 120 may be made of a combination of plastics and rubbers, or of any other synthetic material. The housing 120 may also be waterproof. The housing 120 may include a clasp, or another mechanism to aid in removal of the housing 120 from a user's arm. The housing may include one or more buttons 110, and one or more microphones 130. Although the wearable device is described as a band, the wearable device may be a watch, pair of eyeglasses, or any other device that can be worn or attached to the body or clothing.

Figure 1B:
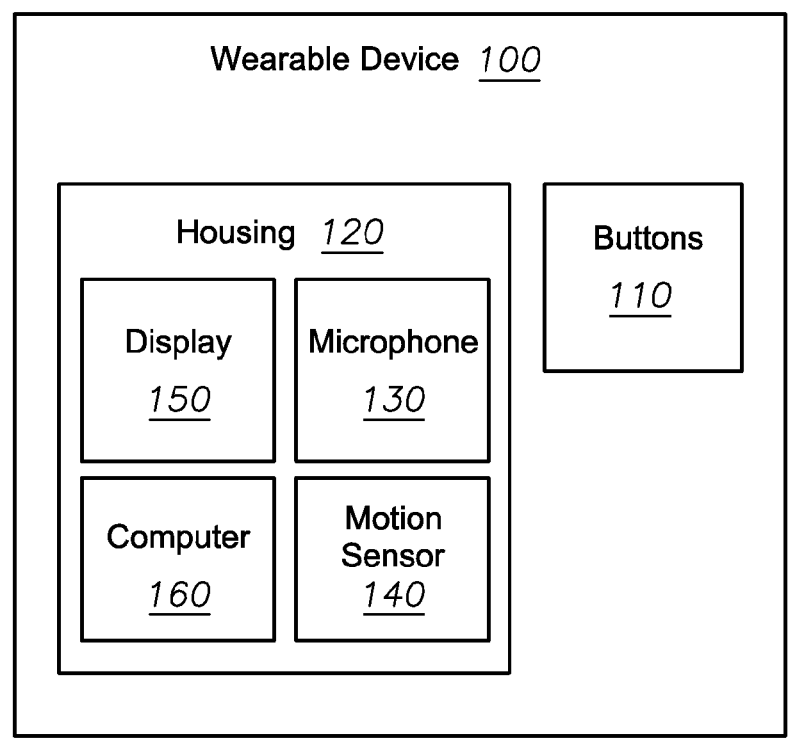
FIG. 1B is a block diagram of a wearable device in accordance with implementations of various techniques described herein.

FIG. 1B illustrates a block diagram of the wearable device 100 in accordance with various implementations described herein. As shown in FIG. 1B, the housing 120 may include a computer 160 and at least one motion sensor 140. The at least one motion sensor 140 may include one or more accelerometers, gyroscopes, muscle activity sensors, any other motion sensor, or any combination of motion sensors. The at least one motion sensor 140 is configured to capture motion data.

The wearable device may include one or more microphones 130, or any other audio sensor, for recording audio data. In one implementation, the computer 160, described in more detail in FIG. 7, may be loaded with software to analyze audio data and detect voice commands (i.e., voice recognition software). For example, if a fisherman says "catch" when a catch occurs, the software may analyze the audio data to determine that a voice command has been made corresponding to a catch. The software may record that a catch has occurred, the location of the catch, and a timestamp corresponding to the time of the catch. In another implementation, the wearable device may record audio data and then transmit the audio data to a second device, such as a marine electronics device 800, further described in FIG. 8, or a smartphone device. For example, if a fisherman said "fish on" when a fish is on the line, the recorded audio data could be transmitted to a marine electronics device 800. The marine electronics device 800 may analyze the audio data to determine that a voice command has been made corresponding to a fish being on the line. The marine electronics device 800 may then record that a fish is on the line, a timestamp, and a location.

The wearable device 100 may also include one or more buttons 110. The one or more buttons 110 may be used for user input. For example, the one or more buttons 110 may be used to input the occurrence of a catch. The catch may then be recorded. As another example, the one or more buttons 110 may be used to input the weight of a caught fish. The weight may then be recorded. As yet another example, a user may press a button 110 to input the occurrence of a catch, and then may press a different button 110 to input the weight of the caught fish. The occurrence of the catch and the weight may then be recorded. As yet another example, the one or more buttons 110 may be used to input the occurrence of a bite.

The wearable device 100 may use any combination of the at least one microphone 130, the at least one motion sensor 140, and the one or more buttons 110 to detect fishing events. For example, after a fishing cast is made, the wearable device 100 may determine that the cast has occurred using a motion sensor 140. If the cast is not detected using a motion sensor 140, the cast may be detected using a microphone 130. If the cast is not detected using a motion sensor 140 or a microphone 130, then the cast may be detected using buttons 110.

The wearable device may further include a display 150. The display may be a series of Light Emitting Diodes (LED). The display may be a Liquid Crystal Display (LCD).

The wearable device 100 may also include wireless technology, such as Bluetooth, Wi-Fi, cellular technology such as GSM or CDMA, satellite communication, or any other wireless technology. In one implementation, the wearable device 100 may be connected wirelessly to a marine electronics device 800. Although the wearable device 100 is described as being wirelessly connected to a marine electronics device 800, it should be understood that the wearable device 100 may be connected to any computer system, including a portable computer system, a smart phone device, a remote server, a cloud server and the like. It should also be understood that the wearable device 100 may be connected to any other device able to store fishing data, e.g., a data logging device.

Figure 2:
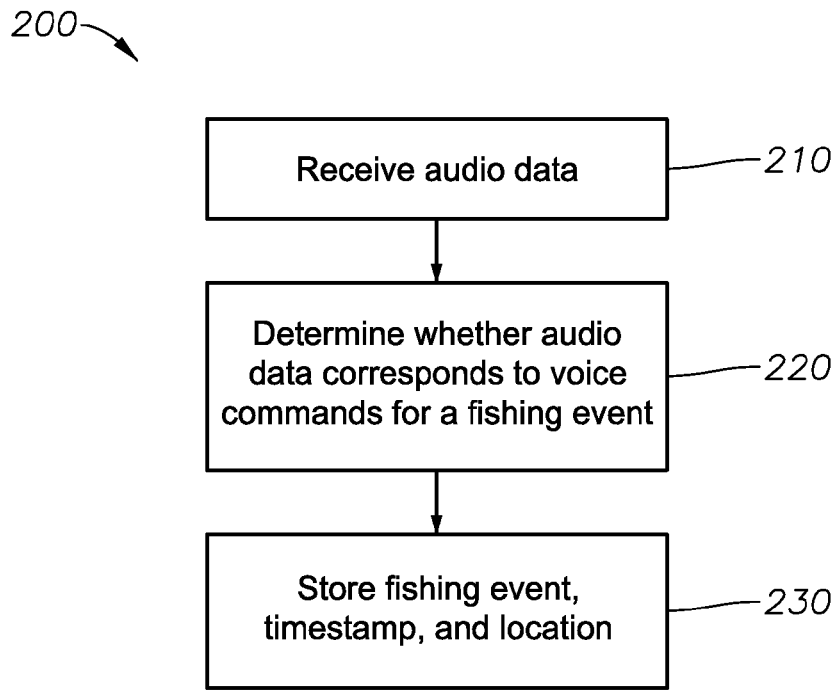
FIG. 2 is a flow diagram for a method of detecting fishing events using voice commands in accordance with implementations of various techniques described herein.

FIG. 2 is a flow diagram for a method 200 of detecting fishing events using voice commands in accordance with implementations of various techniques described herein. In one implementation, method 200 may be performed by a computer 160 in a wearable device 100. In another implementation, method 200 may be performed by any computer system 700, including a portable computer system, a smart phone device, a remote server, a marine electronics device 800, a cloud server and the like. It should be understood that while method 200 indicates a particular order of execution of operations, in some implementations, certain portions of the operations might be executed in a different order, and on different systems. Further, in some implementations, additional operations or steps may be added to the method 200. Likewise, some operations or steps may be omitted.

At block 210, method 200 may receive audio data. The audio data may be audio recorded during a fishing trip. The audio data may be recorded by one or more microphones 160 in a wearable device 100. Alternately, the microphones may be located anywhere within range of a fisherman's voice. For example, one or more microphones may be located in a marine electronics device 800, a smart phone device, in a vessel, on a fishing pole, or elsewhere within range of a fisherman's voice. In one implementation, the audio data may be recorded throughout a fishing trip. In another implementation, the audio data may be recorded after an event occurs. For example, if a cast is detected, audio data may be recorded for the five seconds following the cast, during which time a user may state the type of cast. In yet another implementation, audio data may be received when motion is detected.

Figure 5A:
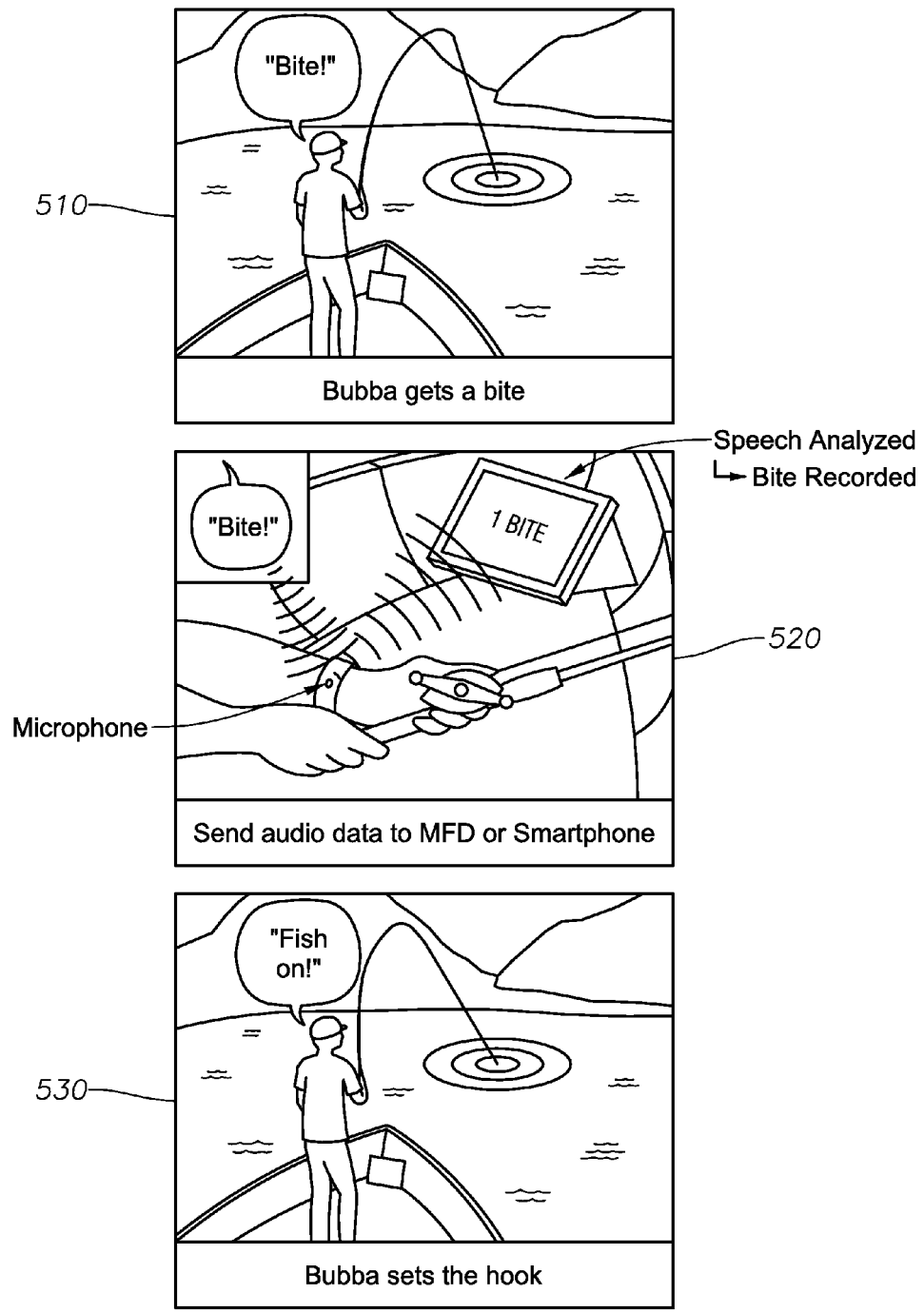
FIGS. 5A and 5B illustrates using voice commands to detect fishing events in accordance with implementations of various techniques described herein.
Figure 5B:
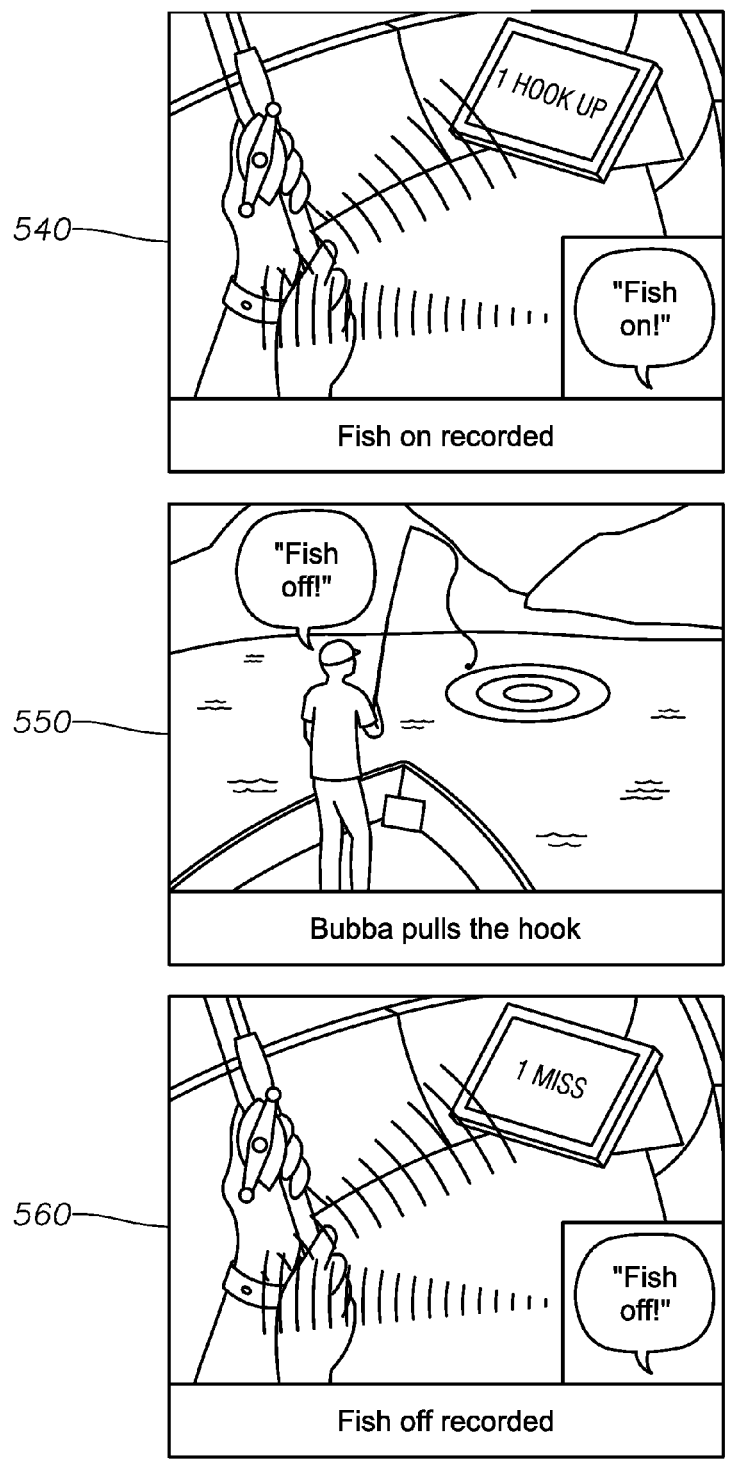

At block 220, method 200 may analyze the audio data to determine whether the audio data corresponds to voice commands for a fishing event. Method 200 may use voice recognition technology to detect voice commands in the audio data. The voice commands detected at block 220 may include commands given to describe fishing events, such as commands indicating the occurrence of a bite, catch, cast, fish on the line, fish off the line, species (i.e., type) of caught fish, approximate weight and length of a caught fish, type and color of lure used, fishing technique used, start of a fight, and end of a fight. FIGS. 5A and 5B illustrate examples of voice commands given to describe the occurrence of a fishing event.

If no audio data corresponding to a voice command is detected at block 220, method 200 may return to block 210 in order to continue receiving audio data, or the method may terminate. If a voice command is detected at block 220, but the method 200 is unable to determine which fishing event the voice command corresponds to, the method 200 may allow a user to select a fishing event, or method 200 may prompt a user to state the audio command again. For example, the user may be prompted to select a fishing event using buttons 110 on a wearable device 100.

Additional information describing the fishing event or associated with the fishing event may be detected at block 220 as well. For example, if the audio data corresponds to a voice command for the occurrence of a cast, method 200 may then determine the type of cast. The type of cast may be determined by analyzing the audio data to determine whether the audio data corresponds to a type of cast. The type of cast may also be automatically determined by analyzing motion data recorded by a motion sensor 140 in a wearable device 100. The type of cast may also be determined by receiving input using buttons 110 in a wearable device 100. In a second example, if the audio data corresponds to a voice command for the occurrence of a catch, method 200 may then determine the type of fish that was caught.

At block 230, method 200 may store a record of the fishing event detected at block 220 to memory, along with the timestamp and location corresponding to the event and any additional information describing the event or associated with the event. The location may be determined using a GPS receiver. The event may be stored as fishing data in local memory or a database. The event may be also be stored in a cloud, i.e., a cloud software service.

In one implementation, blocks 220-230 are performed by a marine electronics device 800. For instance, after capturing the audio data using a microphone 120, the wearable device 100 may transmit the audio data to the marine electronics device 800. The marine electronics device 800 may then perform block 220 by analyzing the audio data and determining whether the audio data corresponds to a voice command for a fishing event. Then, the marine electronics device 800 may perform block 230 by storing the occurrence of the fishing event along with the timestamp and the location corresponding to the fishing event. The location may be determined using a GPS receiver on, or connected to, the marine electronics device 800, and the location and a time stamp may then be stored on the marine electronics device 800.

Although method 200 is described for detecting voice commands corresponding to fishing events, it should be understood that method 200 could be used to detect other marine activities, such as sailing, cruising, or kite surfing. For example, while sailing and wearing a wearable device 100, a user could say "tack," and software could be used to analyze the audio data and determine that a tack is occurring. Then, the time and location of the tack could be recorded.

Figure 3:
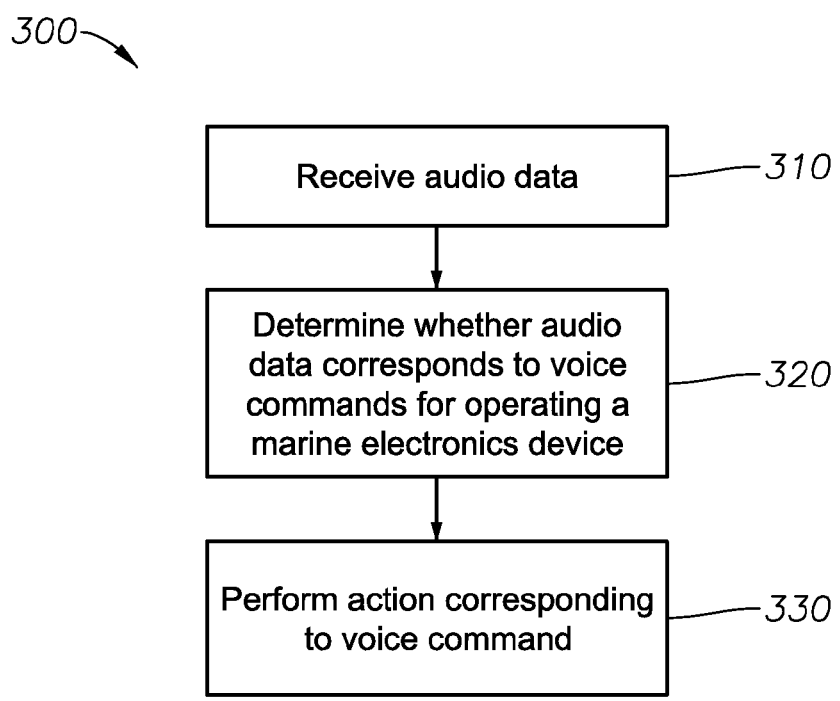
FIG. 3 is a flow diagram for a method of controlling a marine electronics device using voice commands in accordance with implementations of various techniques described herein.

FIG. 3 is a flow diagram for a method of controlling a marine electronics device using voice commands in accordance with implementations of various techniques described herein. In one implementation, method 300 may be performed by the computer 160 in the wearable device 100. In another implementation, method 300 may be performed by any computer system 700, including a portable computer system, a smart phone device, a remote server, a marine electronics device 800, a cloud server and the like. It should be understood that while method 300 indicates a particular order of execution of operations, in some implementations, certain portions of the operations might be executed in a different order, and on different systems. Further, in some implementations, additional operations or steps may be added to the method 300. Likewise, some operations or steps may be omitted.

At block 310, method 300 may receive audio data. The audio data may be audio recorded during a fishing trip. The audio data may be recorded by one or more microphones 130 in a wearable device 100. Alternately, the microphones may be located anywhere within range of a fisherman's voice. For example, one or more microphones may be located in a marine electronics device 800, a smart phone device, in a vessel, on a fishing pole, or elsewhere within range of a fisherman's voice.

Figure 5C:
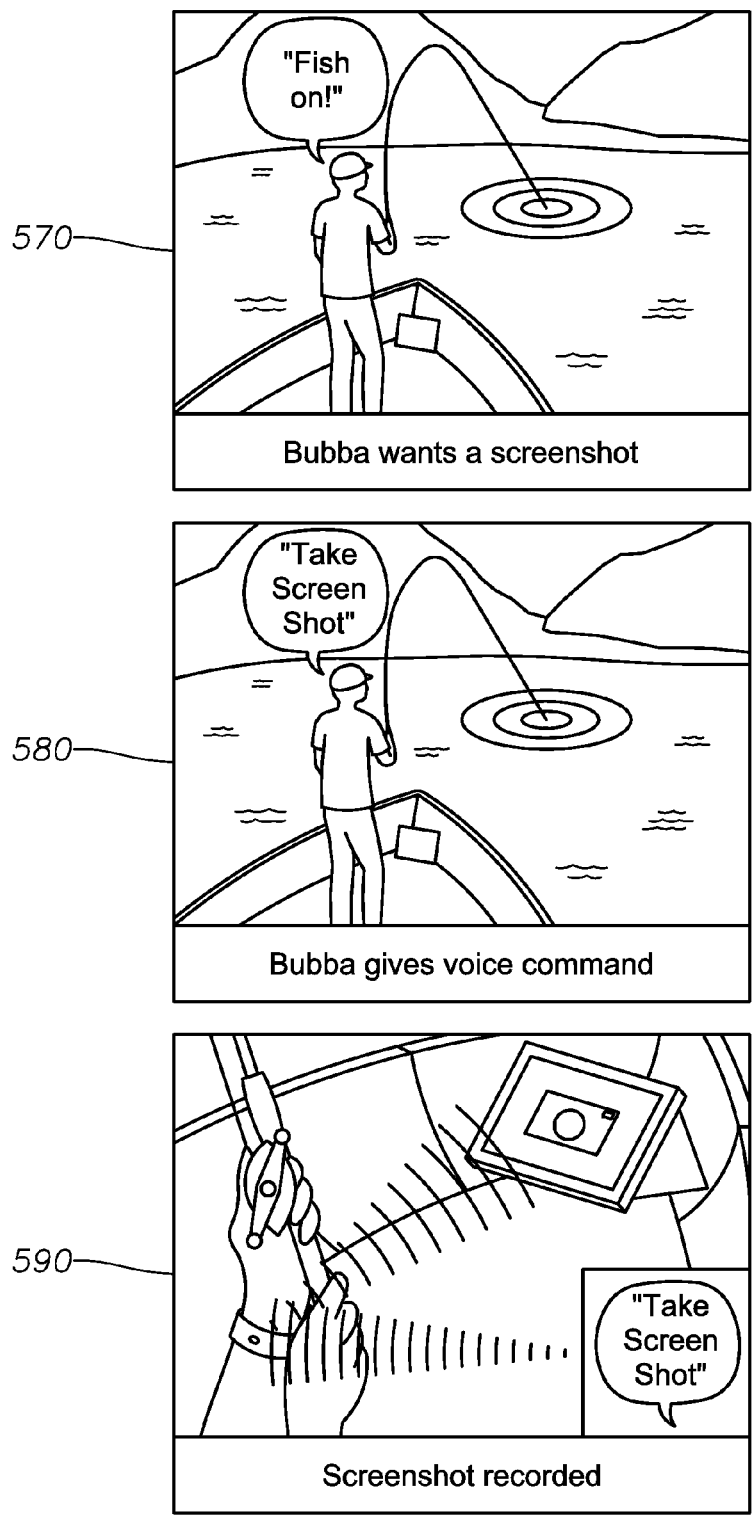
FIG. 5C illustrates using voice commands to control a marine electronics device in accordance with implementations of various techniques described herein.

At block 320, method 300 may analyze the audio data to determine whether the audio data corresponds to voice commands for operating a marine electronics device 800. Method 300 may use voice recognition technology to detect voice commands in the audio data. The voice command may include commands given to control a marine electronics device 800 during a fishing trip, or while fishing, such as add waypoint, add a waypoint corresponding to the location where a fish is caught, take a screenshot, commands given to control an autopilot, change pages or alternate displays, view charts, view sonar, start and finish sonar logs, zoom in or out, or any other commands for controlling the marine electronics device 800. Any command that can be given through a button, touchscreen, or other input used by a marine electronics device may be given using voice commands. FIG. 5C includes examples of voice commands given to control a marine electronics device 800.

If no audio data corresponding to a voice command is detected at block 320, the method 300 may return to block 310 in order to continue receiving audio data, or the method may terminate. If a voice command is detected at block 320, but the method 300 is unable to determine which fishing event the voice command corresponds to, the method 300 may allow a user to select a command for operating a marine electronics device 800, or the method 300 may prompt a user to state the audio command again. For example, the method 300 may display a selection of commands on the marine electronics device.

At block 330, method 300 may perform one or more actions corresponding to the detected voice command. The actions may be performed by a marine electronics device 800. For example, if the voice command is "add waypoint," method 300 may cause a marine electronics device 800 to add a waypoint at the location where the voice command is given. The actions corresponding to the detected voice command may be the same actions that would be performed if the command had been input using a touchscreen, buttons, or other input used by a marine electronics device 800. For example, regardless of whether a user presses a button to take a screenshot or says the word "screenshot," the marine electronics device 800 may perform the same action, which in this example is saving an image file corresponding to the display.

In one implementation, blocks 310 and 320 may be performed by a wearable device 100. The wearable device 100 may then transmit the detected command to a marine electronics device 800, and the marine electronics device 800 may perform the action corresponding to the command. In another implementation, block 310 may be performed by a wearable device 100. Then, the wearable device 100 may transmit the audio data recorded at block 310 to the marine electronics device 800. The marine electronics device 800 may then perform blocks 320 and 330 by analyzing the audio data to detect a voice command, and performing an action corresponding to the command.

Figure 4:
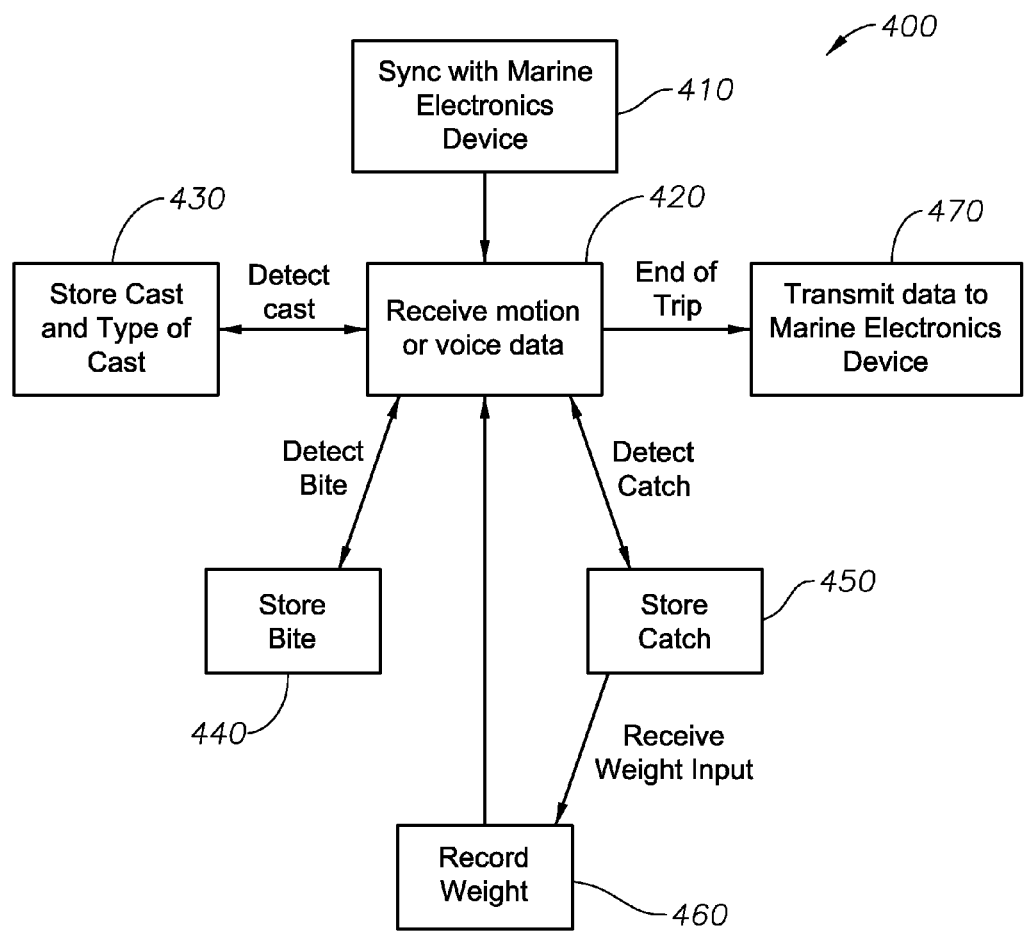
FIG. 4 is a flow diagram describing the operation of a fishing event detecting method in accordance with implementations of various techniques described herein.

FIG. 4 is a flow diagram describing the operation of a fishing event detecting method 400 in accordance with implementations of various techniques described herein. In one implementation, method 400 may be performed by a computer 160 in a wearable device 100. In another implementation, method 400 may be performed by any computer system 700, including a portable computer system, a smart phone device, a remote server, a marine electronics device 800, a cloud server and the like. It should be understood that while method 400 indicates a particular order of execution of operations, in some implementations, certain portions of the operations might be executed in a different order. Further, in some implementations, additional operations or steps may be added to method 400. Likewise, some operations or steps may be omitted.

Figure 6:
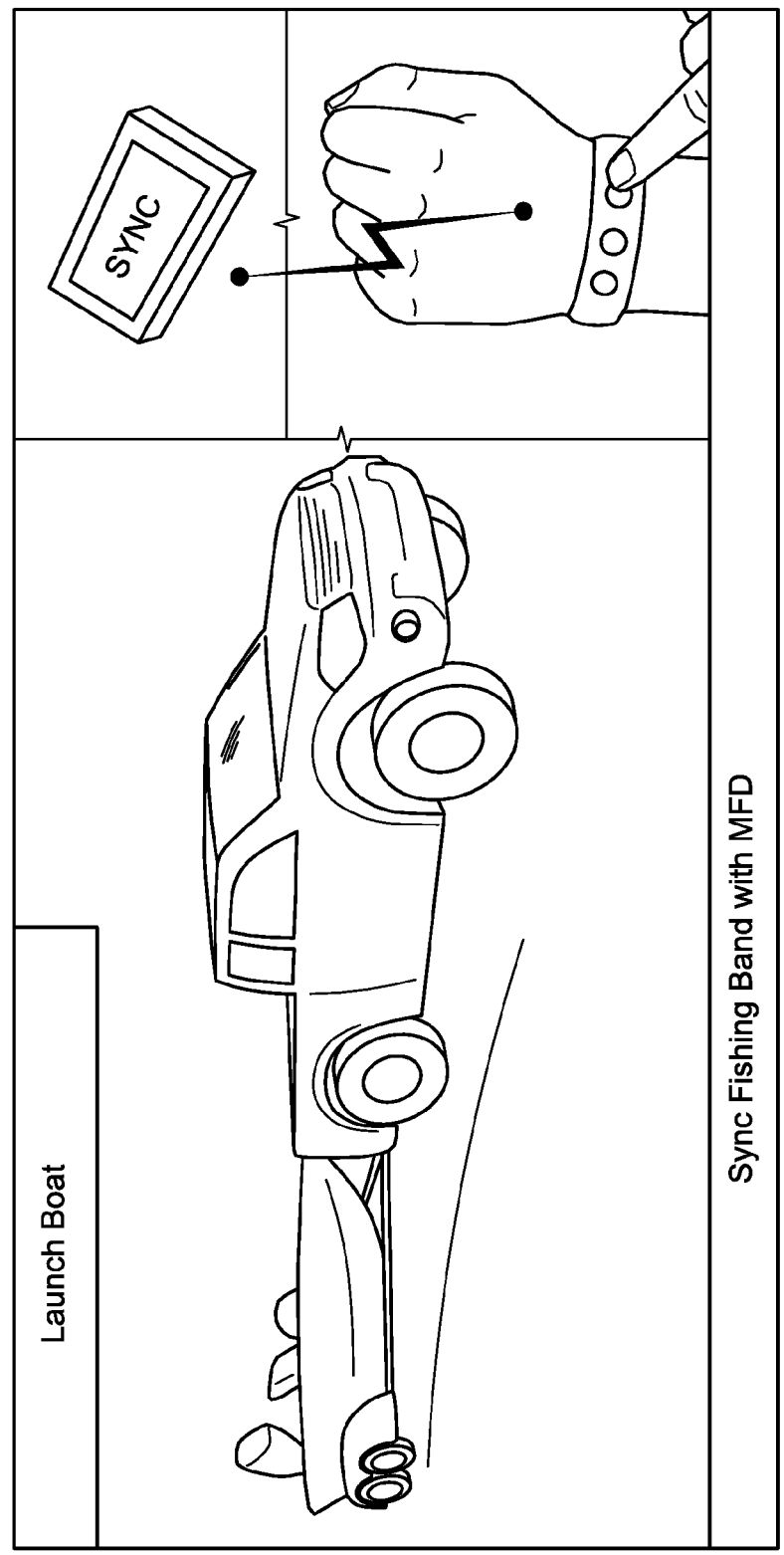
FIG. 6 is an illustration of a wearable device wirelessly transmitting data to a marine electronics device and receiving data from the device in order to begin recording data in accordance with implementations of various techniques described herein.

At block 410, the computer 160 may be synchronized to a marine electronics device or a portable computer device, such as a smart phone. This step is optional. In one implementation, the computer 160 may be wirelessly synchronized to the marine electronics device 800. FIG. 6 illustrates the wearable device 100 being synchronized to the marine electronics device 800.

At block 420, the software may enter a standby mode in which data may be received from the at least one motion sensor 140, the at least one microphone 130, or both, and analyzed. At this step, for instance, the software may continuously monitor for a cast. Once a cast is detected, the cast and the timestamp corresponding to the detected cast may be stored at block 430. In one implementation, at block 430, the software may determine the type of cast used using motion sensor data. In another implementation, the software may determine the type of cast used using audio data. Using audio or motion data, the software may determine whether the cast made is a basic cast, roll cast, side cast, or any other type of cast. For example, after a cast is detected using motion data, a fisherman may say "roll cast." Then, the audio data may be recorded and analyzed to determine that the fisherman gave a voice command corresponding to a roll cast. The software may store the type of cast made at block 430. Then, the software returns to the standby mode, block 420.

While in standby mode at block 420, the software may detect a catch or a bite. The software may detect a catch or a bite based on the motion sensor data, the audio data, or based on input received using buttons. Once a bite or a catch is detected, the occurrence of a bite or a catch and their corresponding timestamp and location may be stored in memory at blocks 440 and 450. The memory may be a database, a log, or any other method of recording the fishing data. In one implementation, a number representing the number of bites or catch that have occurred is stored, with the number being incremented after each bite or catch. The number of bites or catch may be shown on a display 150. Then, the software returns to the standby mode, block 420.

In one implementation, the bites and catches may be detected using one or more buttons 110. To indicate a bite, a user may press a first button 110. To indicate a catch, a user may press a different button 110. Alternately, a user may press a button 110 and then quickly release the button 110 to indicate the occurrence of a bite. The user may also press the same button 110 and hold the button 110 down for a longer time to indicate a catch.

Once a catch is detected, the software may receive further user input corresponding to the weight of the caught fish at block 460. If the software receives further user input, the software may then store the weight of the caught fish at block 460. The inputted weight may be shown on a display 150. Then, the software returns to the standby mode, block 420.

In one implementation, the weight is entered using the one or more microphones 130. For example, after a catch has been detected, a fisherman may say "ten pounds." The audio data may be analyzed to determine that a voice command corresponding to the weight or approximate weight has been given. Then, the weight may be stored along with the other catch data, e.g., a timestamp and a location.

In another implementation, the weight is entered using one or more buttons 110. The weight may be entered by pushing the one or more buttons 110 a number of times to correspond to the weight of the caught fish. For example, to enter a three pound fish, a button 110 may be pressed three times.

The software may detect other events and store other data as well, using the one or more motion sensors 140, the one or more microphones 130, the one or more buttons 110, or combinations thereof. During a fishing trip, the other data may include: species of a caught fish, type of lure used, color of lure used, fishing technique used (including drop shooting, stray lining, top water, live baiting, bottom fishing, trolling, other techniques), start time of fight, end time of fight, elapsed time during a fight, a fish on the line, a fish off the line, and approximate length of fish. For example, a fisherman could say "start fight" at the beginning of a fight, and "end fight" at the end of a fight. Software could then analyze the audio data to determine that voice commands corresponding to the beginning and end of a fight were given. Then, the time and location of the commands could be stored along with the record of the fight. In another example, while bottom fishing or trolling, a fisherman could say "line out." Software could then analyze the audio data to determine that a voice command corresponding to the line being let out to the bottom was given.

When the trip is over, the software may transmit the stored data wirelessly at block 470 to the connected device, e.g., the marine electronics device 800. In one implementation, the software may transmit the stored data after each new entry, or at any other interval. For example, the transmission may be made after each cast. The transmission may be to a remote server or to any computer system 700, including a smart phone or a marine electronics device. In another implementation, the software may be connected to the connected device throughout the fishing trip, and the connected device may analyze audio data during the fishing trip to determine voice commands.

FIGS. 5A and 5B illustrate using voice commands to detect fishing events in accordance with implementations of various techniques described herein. At block 510, a fisherman named Bubba is fishing and has a bite. Bubba then says "Bite." At block 520, the audio data is recorded by a microphone 130 in a wearable device 100, and transmitted to a marine electronics device 800 having method 200. The marine electronics device 800 then analyzes the audio data to determine that a voice command corresponding to a bite has been given. If it is determined that the a voice command corresponding to a bite has been given, then the marine electronics device 800 stores a record that a bite has occurred, the time of the voice command corresponding to the bite, and the location of the voice command corresponding to the bite.

At block 530, Bubba sets a hook and confirms that a fish is on the line by saying "Fish on." At block 540, the audio data is recorded by a microphone 130 in a wearable device 100, and transmitted to a marine electronics device 800 having method 200. The marine electronics device 800 analyzes the audio data to determine that a voice command corresponding to a fish on the line has been given. If it is determined that a voice command corresponding to a fish on the line has been given, the marine electronics device 800 then stores a record that a fish is on the line, the time that the voice command was given, and the location of the voice command.

At block 550, Bubba pulls the hook and confirms that a fish is off the line by saying "Fish off." At block 560, the audio data is recorded by a microphone 130 in a wearable device 100, and transmitted to a marine electronics device 800 having method 200. The marine electronics device 800 then analyzes the audio data to determine that a voice command corresponding to a fish off the line has been given. If it is determined that a voice command corresponding to a fish off the line has been given, then the marine electronics device 800 stores a record that a fish is off the line, the time that the voice command was given, and the location of the voice command.

FIG. 5C illustrates using voice commands to control a marine electronics device in accordance with implementations of various techniques described herein. At block 570, a fisherman named Bubba is fishing while using a marine electronics device 800. Bubba wants to take a screenshot of the information displayed on the marine electronics device 800. At block 580, Bubba says "Take screen shot." The audio data is recorded by a microphone 130 in a wearable device 100 and transmitted to a marine electronics device 800 having method 300. Alternately, the audio data may be recorded by a microphone in the marine electronics device 800. At block 590, the marine electronics device 800 analyzes the audio data to determine that a voice command corresponding to a request to take a screenshot has been given. The marine electronics device 800 then records an image file corresponding to the marine electronic device's display.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 7:
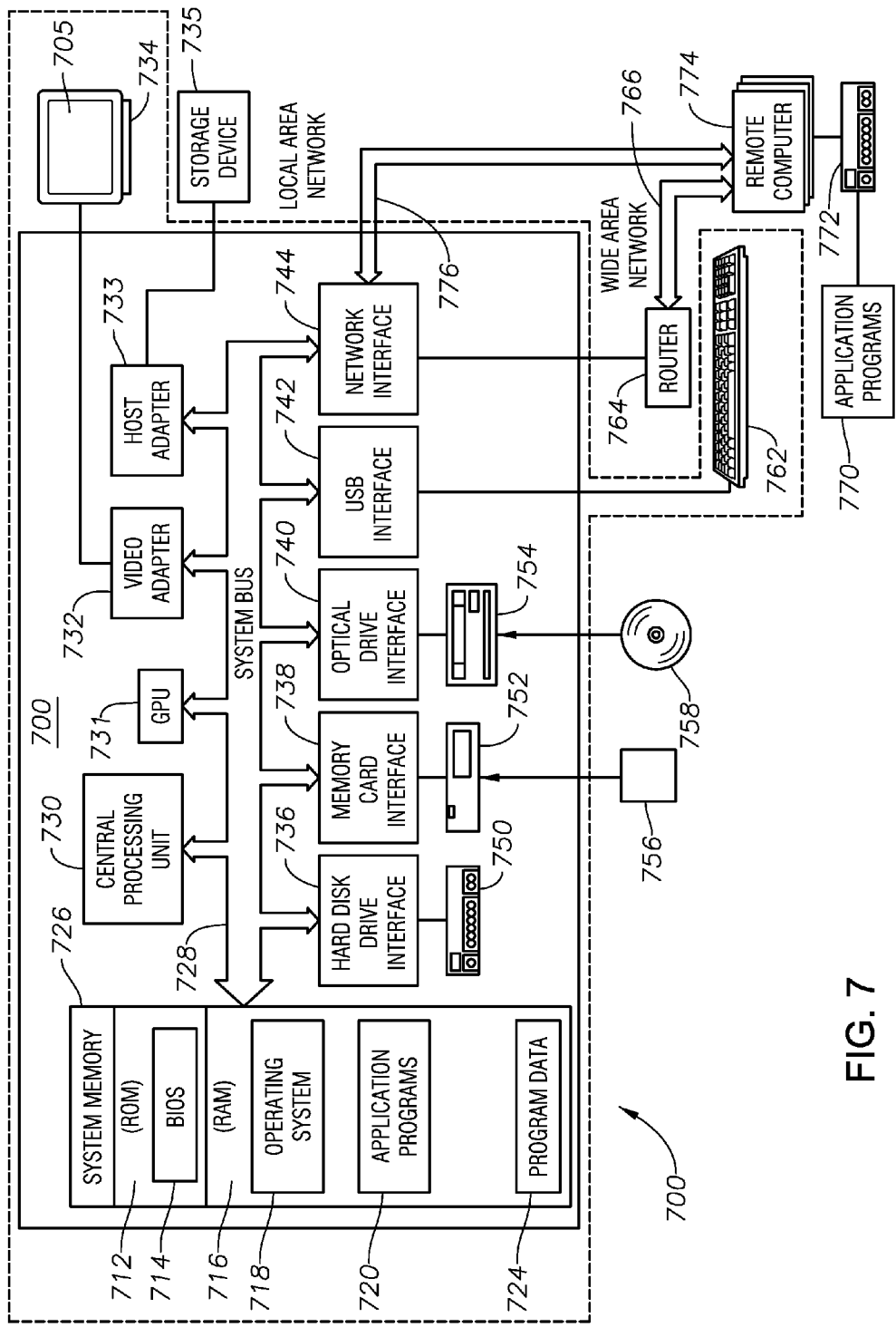
FIG. 7 illustrates a schematic diagram of a computing system in which the various technologies described herein may be incorporated and practiced.

FIG. 7 illustrates a computer system 700 into which implementations of various technologies and techniques described herein may be implemented. Computing system 700 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 700 may include a central processing unit (CPU) 730, a system memory 726 and a system bus 728 that couples various system components including the system memory 726 to the CPU 730. Although only one CPU 730 is illustrated in FIG. 7, it should be understood that in some implementations the computing system 700 may include more than one CPU 730.

The CPU 730 can include a microprocessor, a microcontroller, a processor, a programmable integrated circuit, or a combination thereof. The CPU 730 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 730 may also include a proprietary processor. The CPU may include a multi-core processor.

The CPU 730 may provide output data to a Graphics Processing Unit (GPU) 731. The GPU 731 may generate graphical user interfaces that present the output data. The GPU 731 may also provide objects, such as menus, in the graphical user interface. A user may provide inputs by interacting with the objects. The GPU 731 may receive the inputs from interaction with the objects and provide the inputs to the CPU 730. In one implementation, the CPU 730 may perform the tasks of the GPU 731. A video adapter 732 may be provided to convert graphical data into signals for a monitor 734. The monitor 734 includes a screen 705. The screen 705 can be sensitive to heat or touching (now collectively referred to as a "touch screen"). In one implementation, the computer system 700 may not include a monitor 734.

The GPU 731 may be a microprocessor specifically designed to manipulate and implement computer graphics. The CPU 730 may offload work to the GPU 731. The GPU 731 may have its own graphics memory, and/or may have access to a portion of the system memory 726. As with the CPU 730, the GPU 731 may include one or more processing units, and each processing unit may include one or more cores.

The system bus 728 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 726 may include a read only memory (ROM) 712 and a random access memory (RAM) 716. A basic input/output system (BIOS) 714, containing the basic routines that help transfer information between elements within the computing system 700, such as during start-up, may be stored in the ROM 712. The computing system may be implemented using a printed circuit board containing various components including processing units, data storage memory, and connectors.

Certain implementations may be configured to be connected to a GPS and/or a sonar system. The GPS and/or sonar system may be connected via the network interface 744 or Universal Serial Bus (USB) interface 742. In one implementation, the computing system 700, the monitor 734, the screen 705 and buttons may be integrated into a console.

The computing system 700 may further include a hard disk drive 736 for reading from and writing to a hard disk 750, a memory card reader 752 for reading from and writing to a removable memory card 756 and an optical disk drive 754 for reading from and writing to a removable optical disk 758, such as a CD ROM, DVD ROM or other optical media. The hard disk drive 750, the memory card reader 752 and the optical disk drive 754 may be connected to the system bus 728 by a hard disk drive interface 736, a memory card interface 738 and an optical drive interface 740, respectively. The drives and their associated computer-readable media may provide nonvolatile storage of computer-readable instructions, data structures, program modules and other data for the computing system 700.

Although the computing system 700 is described herein as having a hard disk 750, a removable memory card 756 and a removable optical disk 758, it should be appreciated by those skilled in the art that the computing system 700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 700. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 700 may also include a host adapter 733 that connects to a storage device 735 via a small computer system interface (SCSI) bus, a Fiber Channel bus, an eSATA bus, or using any other applicable computer bus interface. The computing system 700 can also be connected to a router 764 to establish a wide area network (WAN) 766 with one or more remote computers 774. The router 764 may be connected to the system bus 728 via a network interface 744. The remote computers 774 can also include hard disks 772 that store application programs 770.

In another implementation, the computing system 700 may also connect to one or more remote computers 774 via local area network (LAN) 776 or the WAN 766. When using a LAN networking environment, the computing system 700 may be connected to the LAN 776 through the network interface or adapter 744. The LAN 776 may be implemented via a wired connection or a wireless connection. The LAN 776 may be implemented using Wi-Fi technology, cellular technology, or any other implementation known to those skilled in the art. The network interface 744 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 774. It will be appreciated that the network connections shown are exemplary and other means of establishing a communications link between the computer systems may be used. The network interface 744 may also include digital cellular networks, Bluetooth, or any other wireless network interface.

A number of program modules may be stored on the hard disk 750, memory card 756, optical disk 758, ROM 712 or RAM 716, including an operating system 718, one or more application programs 720, program data 724 and a database system. The one or more application programs 720 may contain program instructions configured to perform methods 200, 300, or 400 according to various implementations described herein. The operating system 718 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 700 through input devices such as a keyboard 762 and pointing device. Other input devices may include a microphone, joystick, game pad, satellite dish, scanner, user input button, wearable device, or the like. These and other input devices may be connected to the CPU 730 through a USB interface 742 coupled to system bus 728, but may be connected by other interfaces, such as a parallel port, Bluetooth or a game port. A monitor 705 or other type of display device may also be connected to system bus 728 via an interface, such as a video adapter 732. In addition to the monitor 734, the computing system 700 may further include other peripheral output devices such as speakers and printers.

Marine Electronics Device

Figure 8:
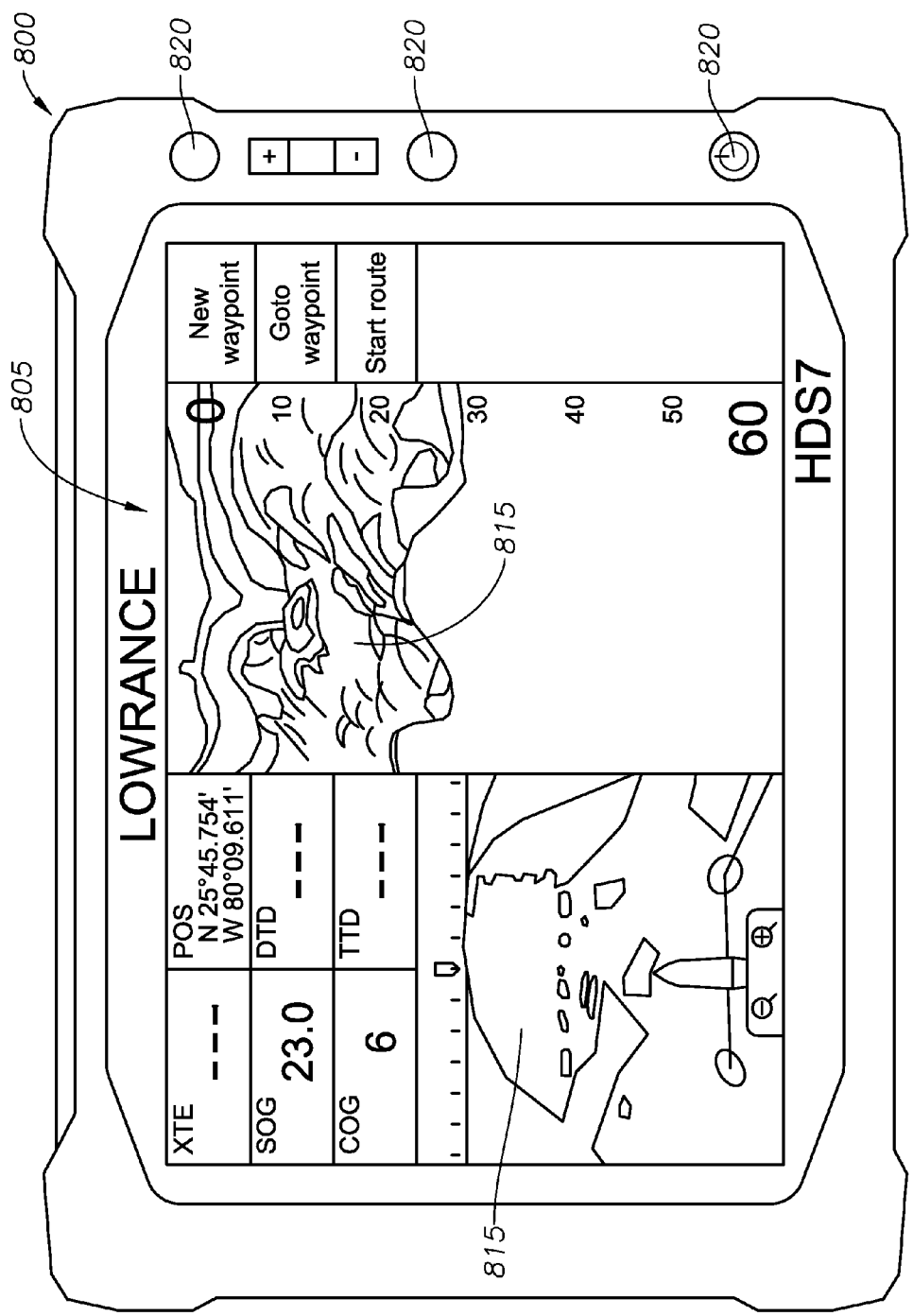
FIG. 8 illustrates a schematic of a marine electronics device in accordance with implementations of various techniques described herein.

FIG. 8 illustrates a schematic diagram of a marine electronics device 800 in accordance with various implementations described herein. The marine electronics device 800 includes a screen 805. In certain implementations, the screen 805 may be sensitive to touching by a finger. In other implementations, the screen 805 may be sensitive to the body heat from the finger, a stylus, or responsive to a mouse. The device 800 may display marine electronic data 815. The marine electronic data types 815 may include chart data, radar data, sonar data, steering data, dashboard data, navigation data, fishing data, and the like. The marine electronics device 800 may also include a plurality of buttons 820, which may be either physical buttons or virtual buttons, or a combination thereof. The marine electronics device 800 may include one or more microphones, or may receive audio data recorded by one or more microphones. The audio data may be analyzed by the marine electronics device 800 to detect voice commands, which may be used as input by the marine electronics device 800. The marine electronics device 800 may receive input through a screen 805 sensitive to touch, buttons 820, or voice commands.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   at least one microphone configured to record audio data formed from a voice of a user during a fishing trip;
   a memory configured to store a plurality of pre-set associations between possible stored audio data and voice commands, wherein each voice command is associated with a fishing event; and
   a computer system having a processor, wherein the memory has stored thereon a plurality of executable instructions which, when executed by the processor, cause the processor to:
   receive the audio data from the at least one microphone;
   compare the audio data with the possible stored audio data to determine whether the received audio data corresponds to a voice command;
   determine, in an instance in which the received audio data corresponds to the voice command, the fishing event associated with the voice command;
   determine a timestamp corresponding to the received audio data;
   store a record of an occurrence of the determined fishing event and the determined timestamp; and
   cause one of:
   transmission of the record of the occurrence of the determined fishing event and determined timestamp to a marine electronic device for operation of the marine electronic device using the record of the occurrence of the determined fishing event and determined timestamp; or operation of the marine electronic device using the record of the occurrence of the determined fishing event and determined timestamp.

2. The apparatus of claim 1, wherein the executable instructions that cause the processor to determine whether the received audio data corresponds to the fishing event comprises executable instructions that cause the processor to detect the spoken word "bite," the spoken word "catch," or the spoken word "cast".

3. The apparatus of claim 1, wherein the memory further comprises executable instructions that cause the processor to:
 determine, in response to receiving the audio data, a location of the apparatus;
 store the location in association with the occurrence of the determined fishing event and the determined timestamp; and
 cause one of:
  transmission of the location in association with the occurrence of the determined fishing event and determined timestamp to the marine electronic device for operation of the marine electronic device using the location; or
  operation of the marine electronic device using the location in association with the occurrence of the determined fishing event and determined timestamp.

4. The apparatus of claim 1, further comprising at least one sensor that detects motion, wherein the apparatus is wearable such that it is capable of being worn by the user, and wherein the memory further comprises executable instructions that cause the processor to:
 receive motion data from the at least one sensor;
 analyze the motion data to automatically determine fishing statistics;
 store a record of the fishing statistics; and
 cause one of:
  transmission of the fishing statistics to the marine electronic device for operation of the marine electronic device using the fishing statistics; or
  operation of the marine electronic device using the fishing statistics.

5. The apparatus of claim 1, wherein the fishing event is further a catch, cast, bite, fish on the line, fish off the line, a start of a fight, or an end of a fight.

6. The apparatus of claim 1, wherein the memory further comprises executable instructions that cause the processor to:
 determine that the received audio data corresponds to one of a fishing input category, wherein the fishing input category comprises one of a species of caught fish, approximate weight of caught fish, approximate length of caught fish, type of lure used, color of lure used, fishing technique used, or type of cast;
 determine a data input from the received audio data for the determined fishing input category;
 store the data input in association with the determined fishing input category such that the data input is categorized and searchable; and
 cause one of:
  transmission of the data input in association with the occurrence of the determined fishing event and determined timestamp to the marine electronic device for operation of the marine electronic device using the data input; or
  operation of the marine electronic device using the data input in association with the occurrence of the determined fishing event and determined timestamp.

7. A non-transitory computer-readable medium having stored thereon a plurality of computer-executable instructions which, when executed by a computer, cause the computer to:
 receive audio data from one or more microphones, wherein the received audio data is formed from a voice of a user during a fishing trip;
 compare, based on a plurality of pre-set associations between possible stored audio data and voice commands, the audio data with the possible stored audio data to determine whether the received audio data corresponds to a voice command, wherein each voice command is associated with a fishing event;
 determine, in an instance in which the received audio data corresponds to a voice command, the fishing event associated with the voice command;
 determine a timestamp corresponding to the received audio data;
 store a record of an occurrence of the determined fishing event and the determined timestamp; and
 cause one of:
  transmission of the record of the occurrence of the determined fishing event and determined timestamp to a marine electronic device for operation of the marine electronic device using the record of the occurrence of the determined fishing event and determined timestamp; or
  operation of the marine electronic device using the record of the occurrence of the determined fishing event and determined timestamp.

8. The non-transitory computer-readable medium of claim 7, wherein the instructions to determine that the audio data corresponds to the fishing event comprises executable instructions that cause the processor to detect the spoken word "bite," the spoken word "catch," or the spoken word "cast".

9. The non-transitory computer-readable medium of claim 7, wherein the computer-executable instructions further cause the computer to:
 receive motion data from a sensor that detects motion;
 analyze the motion data to automatically determine fishing statistics;
 store a record of the fishing statistics; and
 cause one of:
  transmission of the fishing statistics to the marine electronic device for operation of the marine electronic device using the fishing statistics; or
  operation of the marine electronic device using the fishing statistics.

10. The non-transitory computer-readable medium of claim 7, wherein the computer-executable instructions further cause the computer to:
 determine, in response to receiving the audio data, a location corresponding to the received audio data;
 store the location in association with the occurrence of the determined fishing event and the determined timestamp; and
 cause one of:
  transmission of the location in association with the occurrence of the determined fishing event and determined timestamp to the marine electronic device for operation of the marine electronic device using the location; or
  operation of the marine electronic device using the location in association with the occurrence of the determined fishing event and determined timestamp.

11. The non-transitory computer-readable medium of claim 7, wherein the fishing event is further a catch, cast, bite, fish on the line, fish off the line, a start of a fight, or an end of a fight.

12. The non-transitory computer-readable medium of claim 7, wherein the computer-executable instructions further cause the computer to:
   determine that the received audio data corresponds to one of a fishing input category, wherein the fishing input category comprises one of a species of caught fish, approximate weight of caught fish, approximate length of caught fish, type of lure used, color of lure used, fishing technique used, or type of cast;
   determine a data input from the received audio data for the determined fishing input category;
   store the data input in association with the determined fishing input category such that the data input is categorized and searchable; and
   cause one of:
      transmission of the data input in association with the occurrence of the determined fishing event and determined timestamp to the marine electronic device for operation of the marine electronic device using the data input; or
      operation of the marine electronic device using the data input in association with the occurrence of the determined fishing event and determined timestamp.

13. A non-transitory computer-readable medium having stored thereon a plurality of computer-executable instructions which, when executed by a computer, cause the computer to:
   receive audio data from one or more microphones, wherein the received audio data is formed from a voice of a user during a fishing trip;
   compare, based on a plurality of pre-set associations between possible stored audio data and voice commands, the audio data with the possible stored audio data to determine whether the received audio data corresponds to a voice command, wherein each voice command is associated with instructions for operating a marine electronics device;
   determine, in an instance in which the received audio data corresponds to a voice command, the instruction for operating the marine electronics device associated with the voice command; and
   cause operation of the marine electronics device based on the instruction associated with the voice command.

14. The non-transitory computer-readable medium of claim 13, wherein the voice command for operating a marine electronics device is a command for adding a waypoint, taking a screenshot, selecting an alternate display, controlling an autopilot, changing pages, viewing a chart, viewing sonar, starting or finishing sonar logs, or zooming in or out.

15. The non-transitory computer-readable medium of claim 14, wherein the instructions that cause the computer to determine that the audio data corresponds to the voice command for operating the marine electronics device comprises executable instructions which cause the processor to detect the spoken word "waypoint," the spoken word "screenshot," or the spoken word "display".

16. The non-transitory computer-readable medium of claim 14, wherein the computer-executable instructions further cause the computer to:
   determine, in response to receiving the audio data, a location of the marine electronics device; and
   store a waypoint corresponding to the location of the marine electronics device.

17. The non-transitory computer-readable medium of claim 16, wherein the computer-executable instructions further cause the computer to transmit the waypoint to a cloud software service.

18. The non-transitory computer-readable medium of claim 13, wherein the one or more microphones are in a wearable device, and wherein the audio data is transmitted to the marine electronic device that includes the computer that executes the plurality of computer-executable instructions.

* * * * *